US012527465B2

(12) United States Patent
Timmermann et al.

(10) Patent No.: US 12,527,465 B2
(45) Date of Patent: Jan. 20, 2026

(54) METHOD FOR OPERATING A SURGICAL SYSTEM

(71) Applicant: OLYMPUS Winter & Ibe GmbH, Hamburg (DE)

(72) Inventors: Hendrik Timmermann, Hamburg (DE); Andreas Mueckner, Schwarzenbek (DE)

(73) Assignee: OLYMPUS Winter & Ibe GmbH, Hamburg (DE)

( * ) Notice: Subject to any disclaimer, the term of this patent is extended or adjusted under 35 U.S.C. 154(b) by 687 days.

(21) Appl. No.: 17/899,915

(22) Filed: Aug. 31, 2022

(65) Prior Publication Data

US 2023/0065764 A1 Mar. 2, 2023

Related U.S. Application Data

(60) Provisional application No. 63/240,024, filed on Sep. 2, 2021.

(51) Int. Cl.
*A61B 1/06* (2006.01)
*A61B 1/00* (2006.01)
*A61B 1/05* (2006.01)

(52) U.S. Cl.
CPC .............. *A61B 1/0676* (2013.01); *A61B 1/05* (2013.01); *A61B 1/0008* (2013.01)

(58) Field of Classification Search
CPC ............ A61B 1/00006; A61B 1/00009; A61B 1/00154; A61B 1/3132; A61B 1/000096
See application file for complete search history.

(56) References Cited

U.S. PATENT DOCUMENTS

| 12,239,293 | B2 * | 3/2025 | Russell | A61B 1/018 |
|---|---|---|---|---|
| 2011/0018988 | A1 * | 1/2011 | Kazakevich | G02B 23/2484 |
| | | | | 348/E7.085 |
| 2020/0064549 | A1 * | 2/2020 | Nishina | G06N 3/088 |
| 2020/0322516 | A1 * | 10/2020 | Doser | H04L 65/60 |
| 2022/0167837 | A1 * | 6/2022 | Onikubo | A61B 1/04 |

FOREIGN PATENT DOCUMENTS

| EP | 2 467 074 B1 | 1/2019 |
|---|---|---|
| JP | 2010-158303 A | 7/2010 |

\* cited by examiner

*Primary Examiner* — Alexandra L Newton
(74) *Attorney, Agent, or Firm* — Scully, Scott, Murphy & Presser, P.C.

(57) ABSTRACT

A method including: upon or during the insertion of an endoscope shaft into a trocar sleeve, detecting first brightness values at a distal end of the endoscope shaft by an image sensor over time and detecting a first temporal brightness profile depending on the detected first brightness values and the time, and/or upon or during the withdrawal of the endoscope shaft from the trocar sleeve, detecting second brightness values at the distal end of the endoscope shaft by the image sensor over time and detecting a second temporal brightness profile depending on the detected second brightness values and the time.

19 Claims, 5 Drawing Sheets

METHOD FOR OPERATING A SURGICAL SYSTEM

CROSS-REFERENCE TO RELATED APPLICATION

The present application is based upon and claims the benefit of priority from U.S. Provisional Application No. 63/240,024 filed on Sep. 2, 2021, the entire contents of which is incorporated herein by reference.

BACKGROUND

Field

The present disclosure relates to a method for operating a surgical system with an endoscope having an endoscope shaft. The present disclosure also relates to a surgical system with an endoscope having an endoscope shaft and to a software program product with program code means.

Prior Art

In the prior art, endoscopes, such as video endoscopes, are known which are utilized, for example, to treat humans. Video endoscopes have an elongated, tubular endoscope shaft, on the distal end of which a distally radiating illumination device and an image sensor or respectively an image sensor unit for capturing images from the surroundings of the distal end are provided.

Furthermore, in the endoscope shaft of the video endoscope, an optical waveguide for guiding light to the distal end of the endoscope is provided in the endoscope shaft. To couple light into the optical waveguide in the endoscope shaft, external optical fiber cables are provided which are coupled to the internal optical waveguide.

Moreover, it is known that trocar sleeves are used for minimally invasive surgery in order to provide access to a body cavity or body space. Here, trocar sleeves having a hollow shaft are used, for example, in laparoscopy, by means of which access to an abdominal cavity of a body of a living being is formed. During the minimally invasive procedure, for example, an endoscope or respectively laparoscope or a surgical tool is inserted through the hollow shafts of the trocar sleeves.

SUMMARY

An object is to improve the handling of a surgical system, such as before and/or after a surgical procedure.

Such object can be solved by a method for operating a surgical system with an endoscope having an endoscope shaft, wherein light from a light source, such as an external light source, is guided to a distal end of the endoscope shaft by an optical waveguide and light exits from the distal end of the endoscope shaft, wherein the endoscope shaft is one or more of inserted into a trocar sleeve and withdrawn from the trocar sleeve,
  a) wherein the method comprising, upon or during the insertion of the endoscope shaft into the trocar sleeve, detecting first brightness values at the distal end of the endoscope shaft by an image sensor and detecting a first temporal brightness profile, depending on the detected first brightness values and the time, and/or
  b) upon or during the withdrawal of the endoscope shaft out of the trocar sleeve, detecting second brightness values at the distal end of the endoscope shaft by the image sensor and detecting a second temporal brightness profile depending on the detected second brightness values and the time.

Wherein one or more of the detecting of the first temporal brightness profile and the detecting of the second temporal brightness profile is performed automatically.

When transferring an endoscope or laparoscope through the trocar sleeve, i.e., when inserting the endoscope into a hollow shaft of the trocar sleeve or when withdrawing the endoscope out of the hollow shaft of the trocar sleeve, a defined environment of the trocar sleeve for the light exiting from a distal window from the distal tip of the endoscope is provided, wherein the inside of the trocar sleeve causes a characteristic reflection of the light exiting from the endoscope tip, and wherein the reflected light is detected on the inside of the trocar sleeve by an image sensor, e.g., in the interior of the endoscope shaft.

Based on the reflection behavior of the light that exits at the distal tip of the endoscope, based on the detected brightness values and the detected time when inserting or withdrawing the endoscope, a time-dependent brightness profile is created for the insertion into the trocar sleeve and/or for the withdrawal of the endoscope shaft from the trocar sleeve. For this purpose, an image sensor arranged, for example, on the endoscope tip and in the endoscope shaft for detecting the light reflected from the inside of the trocar sleeve is provided as a CMOS sensor or as a CCD sensor. The brightness values at individual and multiple pixels or the brightness values of an array of or with multiple pixels or the brightness values of all pixels of the image sensor can be detected. The image sensor can be a digital image sensor.

The endoscope utilized or respectively used for the method has in the endoscope shaft one or the image sensor, which detects the brightness values or respectively images of the trocar sleeve when the endoscope shaft is inserted into the trocar sleeve and/or when the endoscope shaft is withdrawn from the trocar sleeve. After the endoscope shaft is inserted into the trocar sleeve, corresponding pictures are taken of a body space of a living being or patient by an image sensor during proper use of the endoscope.

The values or respectively data regarding the brightness values and the time for inserting the endoscope or respectively withdrawing the endoscope from the trocar sleeve are evaluated accordingly, for example, in a computing unit, such as a processor/controller. The computing unit is arranged in this case, for example, externally.

The trocar sleeves used for the method have a hollow shaft which has a distal end and a proximal end. On the proximal end of the trocar sleeve, a head part is arranged which can be larger in cross-section than the cross-section of the hollow shaft at the distal end of the trocar sleeve. The trocar sleeve can be utilized during use in minimally invasive surgery on a body, wherein a distal shaft portion of the trocar sleeve is arranged in a body space of a living being or patient.

The light reflected from the inside of the trocar sleeve is detected in the interior of the endoscope, such as by an image sensor, wherein the corresponding image data are conveyed to a control unit or the like. The control unit in this case can be configured with the computing unit, such as a processor/controller in order to detect and evaluate the corresponding brightness values of the image sensor.

In one embodiment, the trocar sleeve is produced from metal or from plastic.

Here, in an embodiment of the method, depending on the first temporal brightness profile, a passage, such as a complete passage, of the distal end of the endoscope shaft through a distal opening of the trocar sleeve can be determined or ascertained, such as automatically. By determining or ascertaining the passage of the distal end of the endoscope shaft through the distal end of the trocar sleeve, it is possible to determine the point in time at which the distal tip of the endoscope shaft enters a body cavity. This makes it possible to ascertain or record and to save the exact point in time or a corresponding time stamp for the use of the endoscope in a minimally invasive procedure.

In in an embodiment of the method that, when determining or ascertaining the passage of the distal end of the endoscope shaft through the distal opening of the trocar sleeve, a time stamp for the passage of the distal end of the endoscope shaft can be generated. The time stamp for the passage of the distal end of the endoscope shaft can be saved.

In one embodiment of the method, depending on the second temporal brightness profile, a withdrawal, which can be a complete withdrawal, of the distal end of the endoscope shaft from a proximal opening of the trocar sleeve can be determined or ascertained, such as automatically.

In another embodiment, when determining or ascertaining the withdrawal of the distal end of the endoscope shaft from the proximal opening of the pressure trocar sleeve, a time stamp for the withdrawal of the distal end of the endoscope shaft can be generated. The time stamp for the withdrawal of the distal end of the endoscope shaft can be saved.

In the method, both a time stamp for the insertion of the endoscope and a time stamp for the withdrawal of the endoscope from the trocar sleeve can be generated in one embodiment, as a result of which the use time of the endoscope for a surgical procedure can be determined, for example, automatically and exactly based on the first and second temporal brightness profiles. This makes is possible to reliably ascertain the duration of an actual operative procedure in a simple manner. Moreover, further data in addition to the duration of a surgical procedure can be taken into account, such as, for example, switching on and switching off other devices, such as, for example, a device for providing insufflation gas and/or an (additional) light source, etc.

Furthermore, one embodiment of the method can be temporally distinguished in that, during or after determining or ascertaining the withdrawal of the distal end of the endoscope shaft from the proximal opening of the trocar sleeve, the light generated by the light source can be dimmed or the light source can be switched off. This makes it possible to automatically reduce the light intensity or switch off the light source in a timely manner when removing or respectively withdrawing the endoscope from the trocar sleeve, which, for example, minimizes a risk of burns from an intense light source, such as, for example, a laser, as a result of incorrect handling.

According to another aspect of the method, depending on the first temporal brightness profile, when inserting the distal end of the endoscope shaft into the trocar sleeve, the light strength of the light source can be controlled, such as by a closed-loop control device. The light source can be operated in an automatic closed-loop control mode. Here, when performing the method, the fact that the light source operated in the automatic closed-loop control mode for the endoscope has a nearly identical control behavior when inserting into the trocar sleeve or withdrawing from the trocar sleeve is taken advantage of.

In another embodiment of the method, a reduction of the degree of transmission of the optical waveguide can be ascertained, such as automatically, based on the first brightness values by a comparison with a first brightness setpoint at a predetermined position of the distal end of the endoscope shaft in the trocar sleeve and/or based on the second brightness values by a comparison with a second brightness setpoint at a predetermined position of the distal end of the endoscope shaft. Such first and second brightness setpoints can be predetermined. Due to aging processes, during operation of the endoscope the transmission of light through the optical waveguide becomes lower, as a result of which the degree of transmission of the coupled-in light through the optical waveguide is reduced. Based on an automatic determination or ascertainment by a comparison with a brightness setpoint at a predetermined position within the trocar sleeve, it can be ascertained or established that the light transmission of the optical waveguide of the utilized endoscope has deteriorated, as a result of which it can be signaled to a user that the endoscope is unsuitable for use in minimally invasive surgery. Moreover, it can also be ascertained whether the optical waveguide is damaged.

In another embodiment of the method, it is provided that a reduction of the degree of transmission of the optical waveguide can be ascertained, such as automatically, based on the detected first temporal brightness profile by a comparison with a first brightness setpoint and/or based on the detected second temporal brightness profile by comparing with a second brightness setpoint at a predetermined position of the distal end of the endoscope shaft. Such first and second brightness setpoints can be predetermined. By comparing the detected brightness profiles when inserting or when withdrawing the endoscope with a corresponding brightness setpoint profile, a deterioration of the transmission in the optical waveguide can also be established.

As a result of the fact that the degree of transmission of the optical waveguide deteriorates due to wear or aging processes, the control behavior of the light source, such as in the automatic closed-loop control mode, changes accordingly, since by providing a defined environment in the trocar sleeve it can be assumed that the control behavior remains unchanged or respectively constant when the degree of transmission in the optical waveguide stays the same. By comparing the current brightness profiles with brightness setpoint profiles, which are generated, for example, when the endoscope is put into operation with new optical waveguides, it is possible to make a statement about the change in the degree of transmission of the optical waveguide.

Moreover, the method is distinguished in one embodiment in that the image sensor is configured as a CMOS sensor or as a CCD sensor and/or digital brightness values of at least one pixel or an array of pixels or all pixels of the image sensor are detected by the image sensor.

According to another aspect, the first brightness values when inserting the distal end of the endoscope shaft and the first temporal brightness profile can be processed by a computing unit and/or that the second brightness values when withdrawing the distal end of the endoscope shaft and the second temporal brightness profile can be processed and/or evaluated by a computing unit.

The processing and/or evaluation of the brightness values and the temporal brightness profiles can take place using an artificial neural network or using a machine learning algorithm. Such neural networks, for example, a convolutional neural network (CNN), can be suitable for rapid recognition of structures, objects, or profiles. They can be trained for this purpose using training profiles. While the training is a computing-intensive process, the data processing can take place very quickly with the neural network and enables real-time brightness value analysis.

In another aspect, measurement values or respectively additional values and/or parameters regarding the light source and/or the image sensor, such as a video processor, can be additionally detected for the evaluation. This makes it possible to make the evaluation comparable to other evaluations or respectively to correct it when detecting the brightness values while taking into account other measurement values and/or parameters. For example, the closed-loop control mode of the brightness and/or the setting of the brightness and/or the values of the amplification for the image signal, etc. can be taken into account.

For a comparison of a current measurement with previous measurements, in another embodiment of the method that specific information or additional identification features for the components can be used, such as serial number, etc. can be detected and/or recorded.

Such object can also be solved by a surgical system with an endoscope having an endoscope shaft, wherein light from a light source, which can be external, is guided to a distal end of the endoscope shaft by an optical waveguide and light exits from the distal end of the endoscope shaft, wherein the surgical system is configured to perform a method described above. In the system, the same properties, features are embodied as in the method described above. To avoid repetition, explicit reference is made to the previous exposition.

Furthermore, such object can be solved by a software program product with program code means configured to perform a previously described method. The program code means can comprise an artificial neural network or a machine learning algorithm loaded into a data memory and loading the brightness values and the temporal brightness profiles and for classifying the temporal brightness profiles using the artificial neural network or respectively the machine learning algorithm.

BRIEF DESCRIPTION OF THE DRAWINGS

Further features will become evident from the description of embodiments, together with the claims and the appended drawings. Embodiments can fulfill individual features or a combination of several features.

The embodiments are described below, without restricting the general idea of the invention, based on exemplary embodiments in reference to the drawings, whereby we expressly refer to the drawings with regard to the disclosure of all details that are not explained in greater detail in the text. In the drawings.

In the drawings, the same or similar elements and/or parts are, in each case, provided with the same reference numerals such that they are not introduced again in each case.

DETAILED DESCRIPTION

Figure 1:
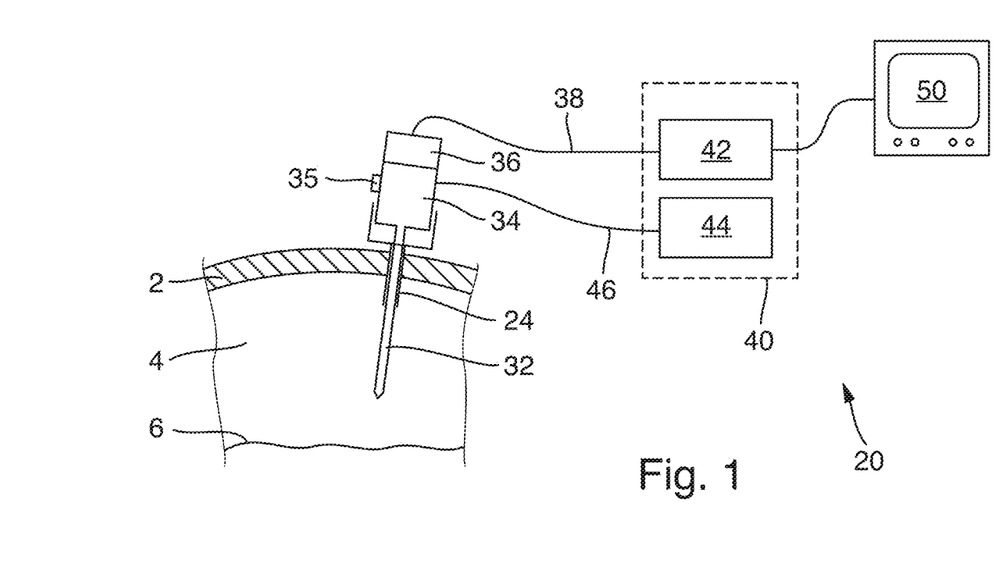
FIG. 1 illustrates a schematic diagram of a system.

FIG. 1 schematically shows a system 20 according to an exemplary embodiment. In the exemplary embodiment shown, the system 20 comprises an endoscope 32 which is inserted through a trocar sleeve 24 through an abdominal wall 2 into the insufflated abdominal cavity 4 of a patient. Trocars or respectively trocar sleeves are instruments with the aid of which access to the abdomen or chest area is created sharply or bluntly and held open by a tube. The means for opening the access are removed from the tube of the trocar sleeve 24 before the endoscope 32 is inserted into the abdomen from the outside through the tube of the trocar sleeve 24.

The means for insufflating the abdominal cavity 4 are not shown in FIG. 1. The endoscope 32 serves to illuminate and observe an organ 6 and has a handle 34 with which it can be grasped and operated during the examination.

In the exemplary embodiment shown, the endoscope 32 is configured as a laparoscope. On its handle 34, the laparoscope has a lateral connection for an optical waveguide 46 via which it is connected to a light source 44. In the inside of the endoscope 32, the light is conveyed to the distal tip of the endoscope 32, where it exits to illuminate the organ 6. The light source 44 can be configured so that it can also generate white illuminating light and/or excitation light in the infrared range or contains a light source for white illuminating light. Both the white illuminating light and the excitation light can then reach the endoscope 32 through the optical wave guide 46. The handle 34 of the endoscope 32 also has an activation actuation element 35, with the actuation of which a user requests that the light source 44 generates light.

On the proximal end, the endoscope 32 has an eyepiece, to which a video head 36 is connected. The video head 36 is connected via an electrical supply line 38 to the control unit 42 (processor/controller) of the control system 40, which in addition can also comprise the light source 44 and the HF generator. Many of these components can also be implemented in a control device with a common housing. The control unit 42 has an image evaluation unit (not shown), which is configured to process the images captured by the video head 36 and is connected to a display device 50 or respectively a monitor to display them.

The trocar sleeve 24 shown in FIG. 1 has an elongated hollow shaft, through which the elongated endoscope shaft of the endoscope 32 is inserted and accommodated, the distal end of which is arranged in the interior of the abdominal cavity. The proximal end of the trocar sleeve 24 is widened on the outside and is configured with a head part.

Figure 2:
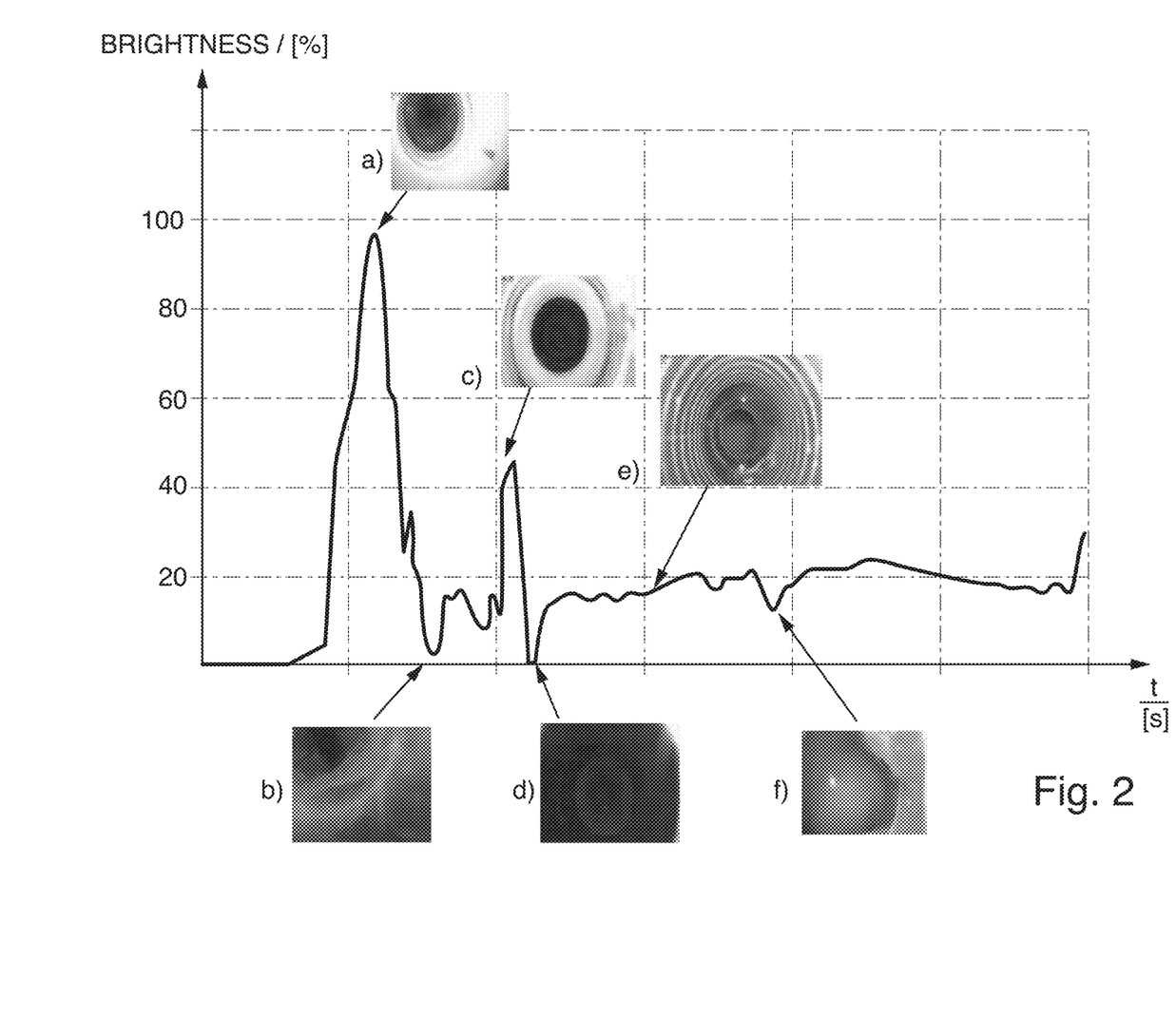
FIG. 2 schematically illustrates a diagram with a temporal brightness profile when inserting an endoscope into a trocar sleeve.

FIG. 2 schematically illustrates the temporal brightness profile when inserting an endoscope into a trocar sleeve in an exemplary diagram. Here, the relative brightness over time is shown. The brightness values measured at an image sensor 36 are shown as relative values.

When inserting the distal tip of the endoscope, the brightness initially increases, since the light from the proximal end of the trocar sleeve is reflected in the head part (cf. image a). The relative brightness then decreases until the distal tip is positioned at an elastic ring on the input side of the hollow shaft at a transition between the proximal-side head part and the distal-side hollow shaft (cf. image b)). After the distal tip of the endoscope has passed the ring, the relative brightness increases again (cf. image c)). After that, the reflection decreases for a short time (cf. image d)). Then the distal tip of the endoscope is guided through the hollow shaft of the trocar sleeve in the direction of the distal end or respectively the distal opening of the trocar sleeve so that the brightness increases (cf. image e)). When the distal tip of the endoscope enters, for example, an abdomen after the distal opening of the trocar sleeve, the brightness at the tip sinks for a short time (cf. image f)).

The temporal brightness profile shown in FIG. 2 is characteristic of the insertion of an endoscope into a trocar sleeve. Here, the relative (automatic) image brightness is shown in FIG. 2 without amplification.

Figure 3:
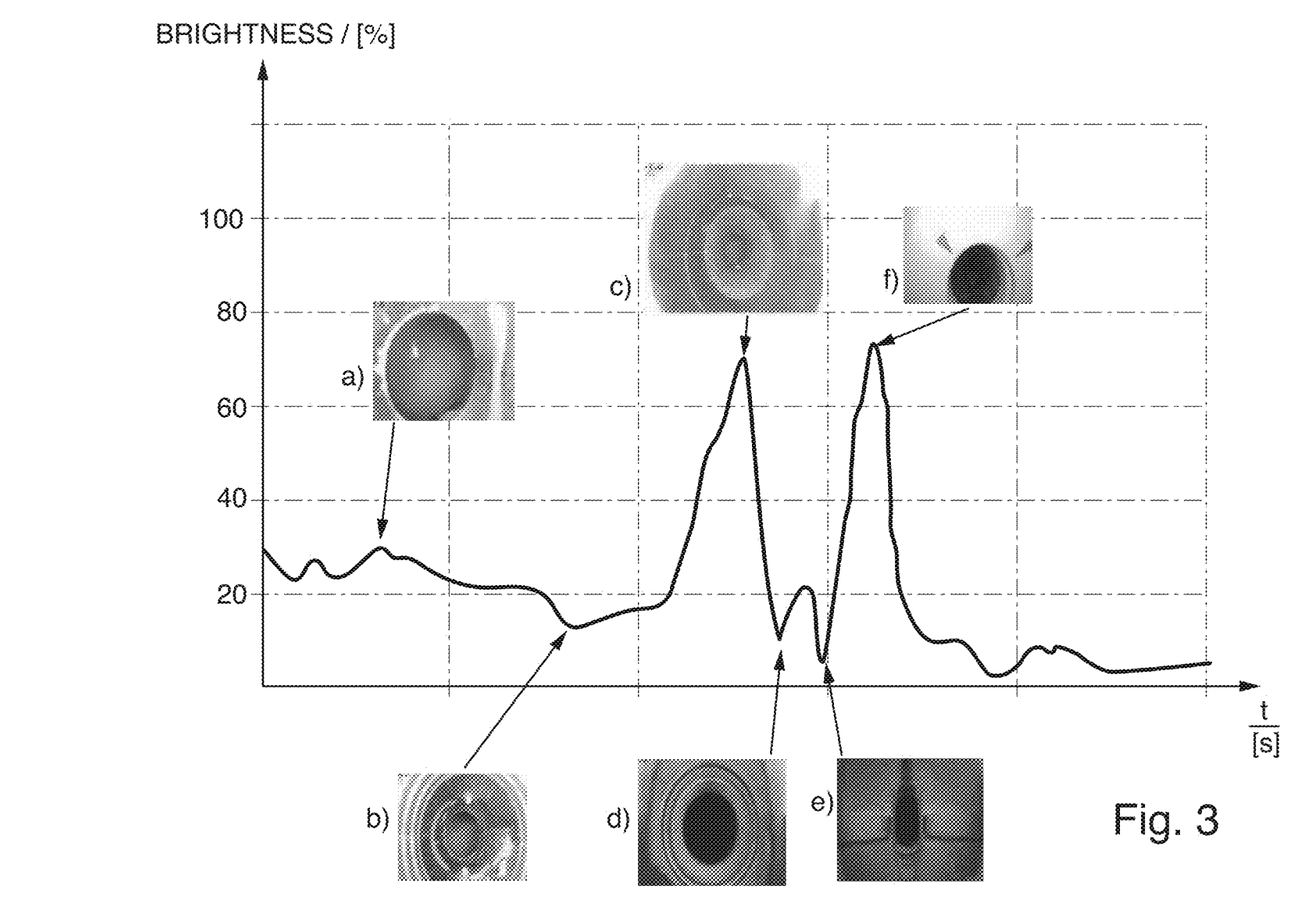
FIG. 3 schematically illustrates a diagram with a temporal brightness profile when withdrawing an endoscope from a trocar sleeve.

FIG. 3 schematically shows the temporal brightness profile when removing or respectively withdrawing the endoscope from the trocar sleeve in an exemplary temporal brightness profile in a diagram.

After reaching a position of the distal tip of the endoscope at the distal end or respectively at the distal opening of the trocar sleeve (cf. image a)), the relative brightness initially decreases, since little light is reflected from the distal end region of the trocar sleeve (cf. image b)). When the endoscope is withdrawn further from the trocar sleeve, the brightness becomes greater until it reaches a maximum (cf. image c)) due to the reflectivity of the increasingly larger hollow space of the distal tip. After that, the relative brightness initially decreases, since a position on the ring at the transition between the distal (hollow) shaft region and the proximal head region is reached (cf. image d)). When the endoscope is withdrawn further, another minimum of the brightness in the region of the elastic ring in the transition between the hollow shaft and the head part of the trocar sleeve results due to the seal, wherein, after withdrawing the endoscope tip from the region of the seal between the proximal head region and the distal shaft region, the brightness increases again (cf. image f)). After that, the brightness decreases again due to the increasingly large distance between the distal tip and the proximal head region.

The brightness profile shown in FIG. 3 is characteristic of the automatic image brightness without amplification of the light and shows the characteristic light/dark switch when withdrawing the tip of an endoscope from a trocar sleeve.

Based on the exemplary temporal brightness profile in FIGS. 2 and 3, it can also be determined at which point in time the distal tip of the endoscope is completely inserted in the trocar sleeve and at which point in time the distal tip of the endoscope is completely withdrawn from the trocar sleeve. Due to these time stamps, the usage duration of the endoscope for a surgical procedure can then be determined exactly.

Figure 4A:
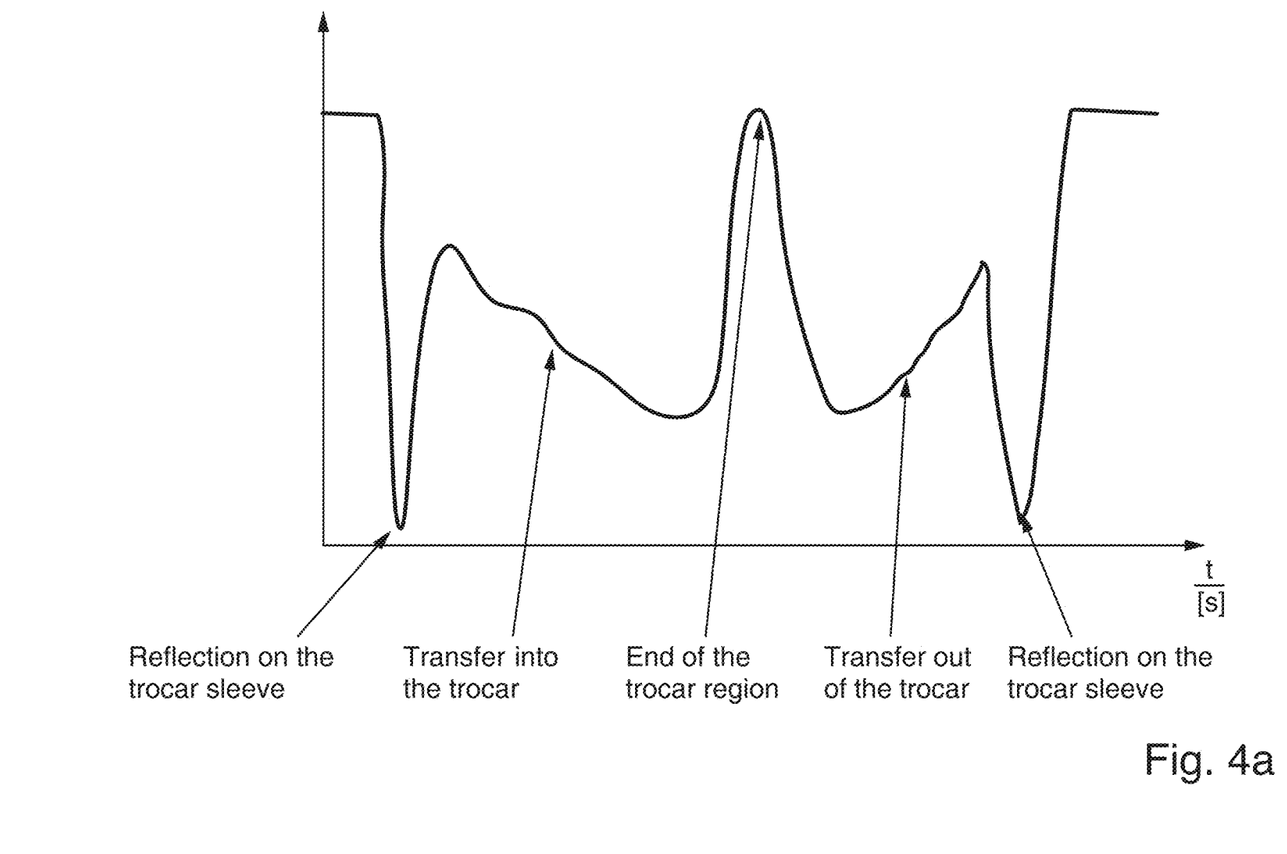
FIG. 4a schematically illustrates a temporal control behavior of a pulse width modulation signal for closed-loop control of the light strength of a light source in an intact, undamped optical waveguide of an endoscope.
Figure 4B:
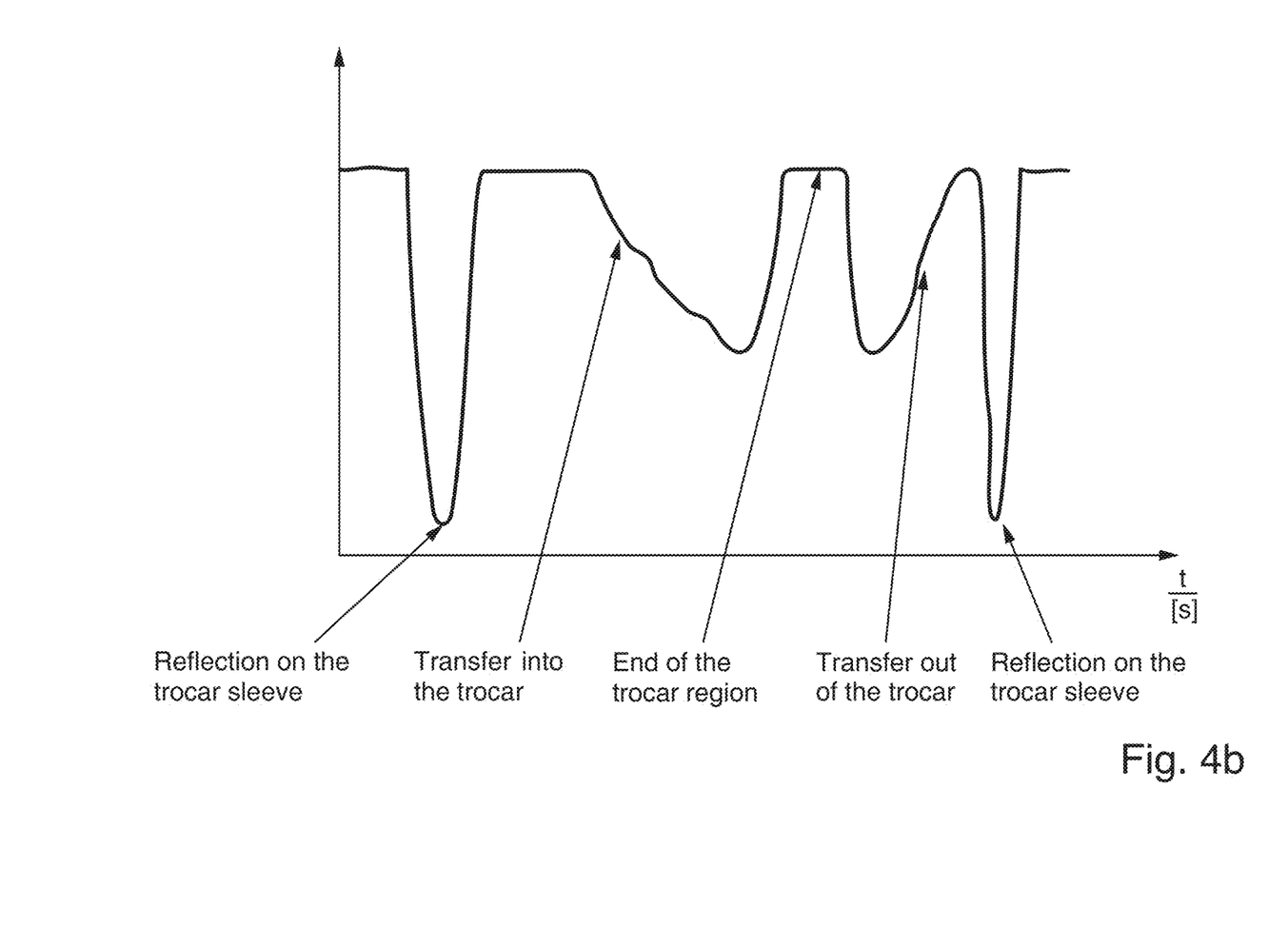
FIG. 4b schematically illustrates the temporal control behavior of a pulse width modulation signal for closed-loop control of the light strength of a light source in an optical waveguide of an endoscope with a low transmission.

In FIG. 4a, 4b, the pulse width modulation signals (PWM signals) when inserting an endoscope tip into a trocar sleeve and when withdrawing the endoscope tip from the trocar sleeve are shown by way of example for an intact, undamped optical waveguide of the endoscope (cf. FIG. 4a) and for a defective or respectively worn optical waveguide of the endoscope with a lower transmission (cf. FIG. 4b).

The PWM signal controls the light strength of the light of a light source for the endoscope via a pulse-position ratio. The higher the pulse-position ratio is, the longer light per time is emitted and the brighter the illuminants are, e.g., LEDs of the light source. In the case of deteriorated light transmission (cf. FIG. 4b) of the optical waveguide of an endoscope, this ratio is higher because more light is required to compensate for the deteriorated transmission in the optical waveguide. It can be detected that the value of the PWM signal is higher in the case of deteriorated transmission.

When comparing the PWM signals of a light source for different optical waveguides of endoscopes shown by way of example in FIG. 4a and FIG. 4b, it can be established that, in the case of the optical waveguide with a deteriorated degree of transmission (cf. FIG. 4b), the values of the PWM signals for the light source are greater than the values of the PWM signals for the light source in the case of an intact optical waveguide (cf. FIG. 4a). This is both for the insertion of the endoscope into the trocar sleeve or respectively into the trocar and for the withdrawal of the endoscope from the trocar sleeve or respectively the trocar.

Based on the temporal curve of the light source control signal or respectively of the PWM signal as a function of time, it can be ascertained whether an optical waveguide with a high degree of transmission or with a lower degree of transmission is utilized in the endoscope.

While there has been shown and described what is considered to be embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

LIST OF REFERENCE NUMBERS

2 Abdominal wall
4 Abdominal cavity
6 Organ
20 System
24 Trocar sleeve
32 Laparoscope
34 Handle
35 Activation actuation element
36 Video head
38 Supply line
40 Control system
42 Control unit
44 Light source
46 Optical waveguide
50 Display device

What is claimed is:
1. A method comprising:
upon or during insertion of an endoscope shaft into a trocar sleeve, detecting first brightness values at a distal end of the endoscope shaft by an image sensor over time and detecting a first temporal brightness profile depending on the detected first brightness values and the time,
upon or during withdrawal of the endoscope shaft from the trocar sleeve, detecting second brightness values at the distal end of the endoscope shaft by the image sensor over time and detecting a second temporal brightness profile depending on the detected second brightness values and the time, and
determining a first time stamp when the endoscope shaft is inserted into the trocar sleeve based on the first temporal brightness profile, determining a second time stamp when the endoscope shaft is withdrawn from the trocar sleeve based on the second temporal brightness profile, and determining a use time of the endoscope shaft based on the first time stamp and the second time stamp.

2. The method according to claim 1, wherein the first time stamp determines a passage of the distal end of the endoscope shaft through a distal opening of the trocar sleeve.

3. The method according to claim 2, wherein the determining of the passage of the distal end of the endoscope shaft through the distal opening of the trocar sleeve comprises completely determining the passage.

4. The method according to claim 2, wherein, when determining the passage of the distal end of the endoscope shaft through the distal opening of the trocar sleeve, generating the first time stamp for the passage of the distal end of the endoscope shaft.

5. The method according to claim 1, wherein the second time stamp determined a withdrawal of the distal end of the endoscope shaft from a proximal opening of the trocar sleeve.

6. The method according to claim 5, wherein, when determining the withdrawal of the distal end of the endoscope shaft from the proximal opening of the trocar sleeve, generating the second time stamp for the withdrawal of the distal end of the endoscope shaft.

7. The method according to claim 5, wherein, during or after determining the withdrawal of the distal end of the endoscope shaft from the proximal opening of the trocar sleeve, turning off or dimming the light generated by the light source.

8. The method according to claim 1, further comprising, when inserting the distal end of the endoscope shaft into the trocar sleeve, controlling the light strength of the light source based on the first temporal brightness.

9. The method according to claim 8, wherein the controlling is performed using a closed loop processor.

10. The method according to claim 1, wherein light from a light source is guided to the distal end of the endoscope shaft by an optical waveguide, the method further comprising ascertaining a reduction of the degree of transmission of the optical waveguide based on one or more of:
the first brightness values by a comparison with a first brightness setpoint at a first predetermined position of the distal end of the endoscope shaft in the trocar sleeve; and
the second brightness values by a comparison with a second brightness setpoint at a second predetermined position of the distal end of the endoscope shaft.

11. The method according to claim 10, wherein the ascertaining of the reduction of the degree of transmission of the optical waveguide is performed automatically.

12. The method according to claim 10, wherein the first brightness setpoint is a predetermined first brightness setpoint and the second brightness setpoint is a predetermined second brightness setpoint.

13. The method according to claim 1, wherein light from a light source is guided to the distal end of the endoscope shaft is by an optical waveguide, the method further comprising ascertaining a reduction of the degree of transmission of the optical waveguide based on one or more of:
the first temporal brightness profile by a comparison with a first brightness setpoint; and
the second temporal brightness profile by comparing with a second brightness setpoint at a second predetermined position of the distal end of the endoscope shaft.

14. The method according to claim 1, wherein the image sensor comprises one of a CMOS sensor and a CCD sensor and digital brightness values of at least one pixel or an array of pixels or all pixels of the image sensors are detected by the image sensor.

15. The method according to claim 1, further comprising one or more of:
first processing the first brightness values when inserting the distal end of the endoscope shaft and the first temporal brightness profile by a processor and
second processing the second brightness values when withdrawing the distal end of the endoscope shaft and the second temporal brightness profile by the processor.

16. The method according to claim 15, wherein one or more of the first and second processing is performed using an artificial neural network or a machine learning algorithm.

17. The method according to claim 1, wherein one or more of the detecting of the first and second temporal brightness profile is performed automatically.

18. A surgical system comprising:
a processor comprising hardware, the processor being configured to:
upon or during insertion of an endoscope shaft into a trocar sleeve, detecting first brightness values at a distal end of the endoscope shaft by an image sensor over time and detecting a first temporal brightness profile depending on the detected first brightness values and the time,
upon or during withdrawal of the endoscope shaft from the trocar sleeve, detecting second brightness values at the distal end of the endoscope shaft by the image sensor over time and detecting a second temporal brightness profile depending on the detected second brightness values and the time, and determining a first time stamp when the endoscope shaft is inserted into the trocar sleeve based on the first temporal brightness profile, determining a second time stamp when the endoscope shaft is withdrawn from the trocar sleeve based on the second temp oral brightness profile, and determining a use time of the endoscope shaft based on the first time stamp and the second time stamp.

19. Non-transitory computer-readable storage medium storing instructions that cause a computer to:
upon or during the insertion of the endoscope shaft into the trocar sleeve, detect first brightness values at the distal end of the endoscope shaft by an image sensor over time and detect a first temporal brightness profile depending on the detected first brightness values and the time,
upon or during the withdrawal of the endoscope shaft from the trocar sleeve, detect second brightness values at the distal end of the endoscope shaft by the image sensor over time and detect a second temporal brightness profile depending on the detected second brightness values and the time; and
determine a first time stamp when the endoscope shaft is inserted into the trocar sleeve based on the first temporal brightness profile, determine a second time stamp when the endoscope shaft is withdrawn from the trocar sleeve based on the second temporal brightness profile, and determine a use time of the endoscope shaft based on the first time stamp and the second time stamp.

* * * * *